April 19, 1955 F. G. STEELE 2,706,811

COMBINATION OF LOW LEVEL SWING FLIP-FLOPS AND A DIODE GATING NETWORK

Filed Feb. 12, 1954 2 Sheets-Sheet 1

INVENTOR:
Floyd G. Steele
BY Hugh L. Millis Jr.

April 19, 1955

F. G. STEELE 2,706,811

COMBINATION OF LOW LEVEL SWING FLIP-FLOPS AND A DIODE GATING NETWORK

Filed Feb. 12, 1954

2 Sheets-Sheet 2

INVENTOR:

Floyd G. Steele

BY Hugh L. Millis Jr.

2,706,811

COMBINATION OF LOW LEVEL SWING FLIP-FLOPS AND A DIODE GATING NETWORK

Floyd G. Steele, La Jolla, Calif., assignor to Digital Control Systems, Inc., La Jolla, Calif., a corporation of California Application February 12, 1954, Serial No. 409,999

16 Claims. (Cl. 340—166)

The present invention relates to the combination of low level swing flip-flops and a diode gating network and, more particularly, to the adaptation of a multi-voltage region diode gating network for use with extremely low level swing flip-flops in digital computer applications.

In a co-pending U. S. application for patent entitled, "Correlation of Flip-Flop and Diode Gating Circuitry Characteristics," Serial No. 375,913, filed August 24, 1953, to Floyd G. Steele there is set forth flip-flops having voltage swings substantially equalling the maximum back resistance value of germanium crystal diodes utilized in an associated gating network. As was pointed out in this application for patent, a typical type of commercially available diode may exhibit a maximum back resistance at an applied back potential of 6 to 7 volts and, in accordance with the invention expressed therein, the flip-flop signal deviation or swing between each of its output signal's high and low voltage levels was made on the order of 6 volts. One, but not the only, effect resulting from such a design was an immense saving in operating power over conventional design techniques.

In the present invention, flip-flop swings are reduced a considerable amount over that noted in the above application, the reason being primarily for the purpose of achieving an even greater power saving in the computer. To this end, vacuum tube flip-flops are eliminated with transistors being employed in their place with plate supply potentials on the order of two volts or less thereby being made possible. However, it has been found that at these greatly reduced flip-flop swings, "and " and "or" gating circuits of the type employing crystal diodes, cannot be satisfactorily employed without certain modifications in their basic circuit configuration. This is due primarily to the fact that the voltage drop across the front of any given diode, even when conducting the extremely small amount of current contemplated in the present design, becomes appreciable in magnitude relative to the overall flip-flop swing.

That this is undesirable may be most readily understood by recalling that, in normal cases, with relatively large flip-flop swings, for example, between 100 and 140 volts or even 22½ and 28½ volts as in the prior mentioned patent application, each gating circuit output signal will substantially vary between the identical same levels. In fact, the only difference between the potential magnitudes of the gating circuits' output signals and flip-flop swings will be caused by the voltage drop across the front resistance of the gating circuit diodes. This drop, normally of only a fraction of a volt, will be of negligible magnitude when considered with the overall 40 volt or 6 volt flip-flop excursions of the above examples.

However, in the present case, a forward drop of .15 volt, taken as a representative example, is not negligible relative to a 2 volt total swing, taken also by example. Each time a flip-flop signal passes through a diode to a gating circuit, a total lowering of the gating circuit's output signal high and lower levels is produced, the amount of lowering being this .15 volt. Accordingly, although the range of the gating circuit swing, that is the actual voltage difference between the high and low levels, will be the same, the voltage region in which the output signal swing falls will be lowered this .15 amount, or will be from —.15 to —2.15 volts for the case of a zero to —2 volt swing. From this, it may be seen that a difficulty arises when the output signal of one gating circuit is fed to one input terminal of another gating circuit, this other gating circuit receiving directly an output signal from a flip-flop as another input signal. In this case, the voltage regions of the two incoming signals will be different and the gating circuit operation will hence not be able to follow the rules desired for its operation since output pulses will be generated when not called for by the gating circuit logic under certain input signal changes.

The alleviation of the above mentioned difficulties forms the principal basis of the present invention. Whenever a case of the above nature is presented, that is, the application of two or more signals lying in different voltage regions to a single gating circuit, resistors are inserted in those incoming lines whose signal regions lie in magnitude between the voltage of the source feeding the gating circuit high valued resistor and the signal whose voltage region differs the most therefrom. The resistor values are so selected that the voltage dividing network thereby formed between them and the gating circuit resistor places their associated input signal regions appearing at the entrance to the gating network within the identical region of the unaltered input line bearing the signal differing the most in magnitude from the gating circuit potential source. In this way, all signals feeding any given circuit will swing within the same region and all of such gating circuits will accordingly operate in the desired manner without producing spurious output pulses.

In addition to the gating network modification as above set forth, a change in conventional timing signal techniques is likewise required in the use of extremely low voltage swing flip-flops. Thus, as herein contemplated, a separate timing signal magnitude is required for each voltage region, the various required timing signals being derived from the third winding, for example, of a blocking oscillator transformer. In particular, one end of this winding is maintained at a voltage equalling the lowest valued incoming signal to the gating circuits of the lowest voltage region, with taps being taken off corresponding to the upper or highest voltage level of each region. With this done, the normal or quiescent state of the timing signal voltage of any given region except the highest one, will be of lower magnitude than the other signals applied to the same gating circuits with the result that each of its respective diodes will be back biased to hence isolate it from the gating circuit associated therewith. When however, the upward going swing takes place at the end of each timing interval, such is transmitted through the diode and will reach the highest valued magnitude of that region owing to the position of its tap and hence be capable of delivering full clocking energy through the gating circuit, if the remaining signals are at the required voltage level, for flip-flop triggering purposes.

It is, accordingly, the principal object of the present invention to provide a suitable diode gating network for use with extremely low voltage swing flip-flops.

Another object of the present invention is to provide means for compensating the forward voltage drop across crystal diodes within diode gating circuits utilized with extremely low voltage swing flip-flops.

A further object of the present invention is to provide voltage compensating means in a diode gating network for all input flip-flop signals lying in different voltage regions than other input signals applied from other gating circuits within the network.

Still another object of the present invention is to provide compensating elements within a multi-region crystal diode gating network such that different voltage region signals may be applied to the same individual gating circuit without the introduction of logical flip-flop triggering errors.

Another object of the present invention is to provide a diode gating network for use with flip-flops having extremely low voltage swings wherein the forward voltage drop across the diodes is significant in magnitude relative to the flip-flop signal swings.

Another object of the present invention is to provide a multi-region gating diode network fed by a series of extremely small swing flip-flop signals for triggering a plurality of bi-stable flip-flops without the introduction of logical errors.

A further object of the present invention is to provide compensating means for applying a first voltage region gating signal to one input terminal of a diode gating circuit when the other input terminal of the gating circuit is fed by another voltage region gating signal.

A still further object of the present invention is to provide a transistor bi-stable flip-flop having an extremely small signal swing and triggered by diode gating circuits to follow the conduction state sequence of a similar small signal swing flip-flop.

A still further object of the present invention is to provide a series of different clocking signals of different respective magnitudes to a series of voltage region gating circuits wherein the flip-flops have extnemely small signal swings.

Other objects and features of the present invention will be readily apparent to those skilled in the art from the following specification and appended drawings wherein is illustrated a preferred form of the invention, and in which.

Figure 1:
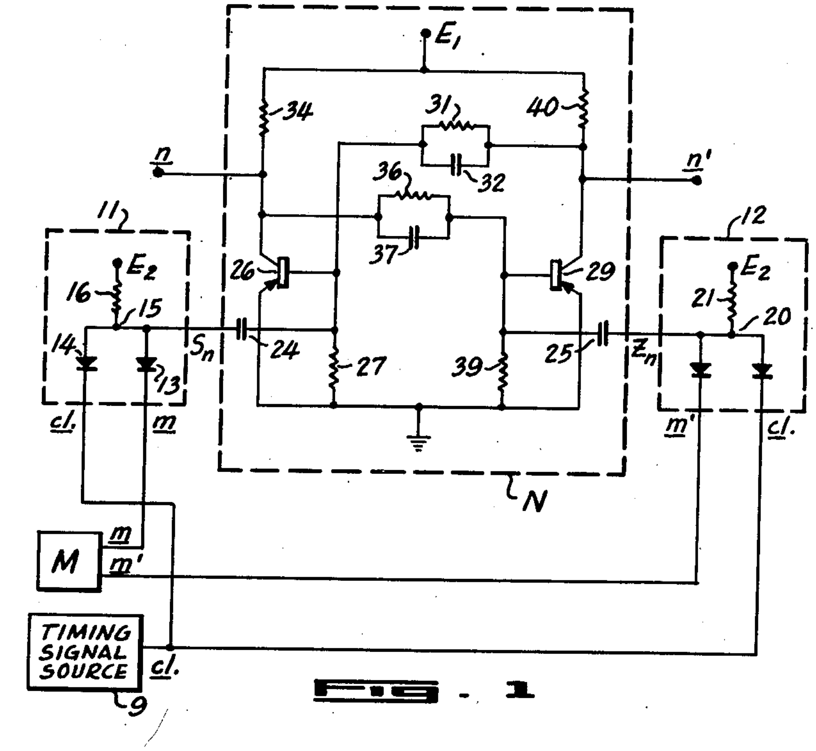
Figure 1 is a circuit diagram of a transistor flip-flop stepping register.

Before considering in detail the flip-flop and multi-range gating network combination according to the present invention, a preferred type of flip-flop having the proper output signal swing range is first presented, it being formed of a pair of transistors and triggered by relatively simple gating circuits. Thus, for this presentation, a pair of bi-stable flip-flops are illustrated in Figure 1, designated M and N along with a timing signal source 9, the circuit arrangement being such that the consecutive binary values represented by the consecutive conduction states of flip-flop M are successively transferred into flip-flop N. Flip-flop M, for example, may be initially associated with the output data coming from a serial magnetic memory channel, or it with flip-flop N may together form two adjacent stages in a serial stepping register. Timing signal source 9 may comprise a multi-vibrator circuit, a blocking oscillator, or the like and may be either free running as in certain computer control applications or may be triggered by the signal sensed from a timing signal track on an associated memory drum.

Considering now the actual circuitry involved in Figure 1, output signal *m* is applied within an "and" gating circuit 11 to the anode of a unidirectional flow device, such as crystal diode 13, the cathode of diode 13 being connected to a common junction 15. In the same way, signal *cl* is applied through a diode 14 to junction 15, junction 15 being coupled through a resistor 16 of a relatively high value to the negative terminal $E_2$ of a source of potential, not specifically illustrated. Gating circuit 12 is similar in all respects to circuit 11 with complementary signal *m'* from flip-flop M and signal *cl* being applied through a pair of diodes therein to a common junction 20, junction 20, in turn, being connected through a resistor 21 to the $E_2$ terminal.

Junction 15 of circuit 11 is connected to the $S_n$ input conductor of flip-flop N, it, in turn, being coupled to one plate of a triggering capacitor 24 while junction 20 of circuit 12 is connected to $Z_n$ input conductor of flip-flop N, it being connected to one plate of the other flip-flop triggering capacitor 25. The other plate of capacitor 24 is connected to the base electrode of a first transistor 26, the base electrode, in turn, being connected through a base resistor 27 to ground and to the collector electrode of a second transistor 29 through a paralleled resistor 31 and capacitor 32. The collector electrode of transistor 26 is connected through a load resistor 34 to the $E_1$ terminal of a source of negative potential, the source not being here illustrated, and is additionally coupled to the base of transistor 29 through a paralleled resistor 36 and capacitor 37, similar to resistor 31 and capacitor 32, respectively.

The other plate of triggering capacitor 25 is connected to the base electrode of transistor 29, this base being additionally coupled to ground through a base resistor 39, similar to resistor 27. The collector electrode of transistor 29 is connected through a load resistor 40, similar to resistor 34, to the $E_1$ terminal. The output signal *n* of flip-flop N is taken directly from the collector electrode of transistor 26, while signal *n'* is taken from the collector electrode of transistor 29. The emitter electrodes of transistors 26 and 29 are connected together and to ground, as shown in Figure 1.

Figure 2:
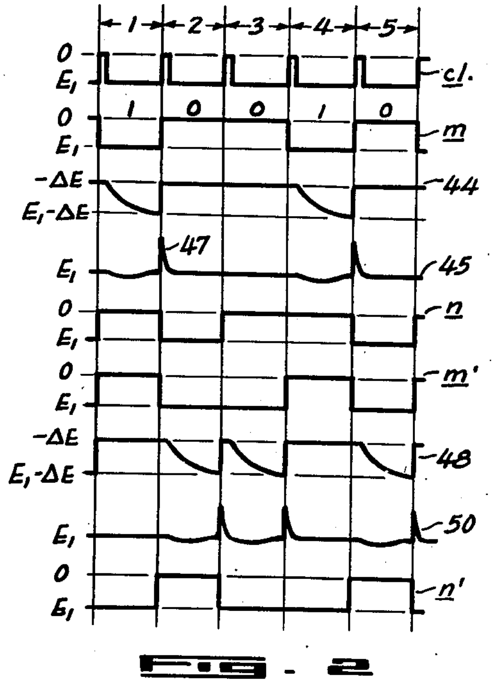
Figure 2 is a group of signal waveforms appearing at various points in the circuit of Figure 1.

Referring to Figure 2, there is illustrated a group of signal waveforms appearing at various points in the circuit of Figure 1, the waveforms here being presented for the purpose of explaining the operation of the circuit. Signal *cl* comprises a series of regularly time spaced positive pulses, each rising from the $E_1$ terminal potential magnitude which may be, for example, minus two volts to ground reference or zero volts. The time between any two consecutive positive pulse leading edges is taken as a single timing interval with the signal *cl* successive positive pulses thereby serving to mark successive timing intervals, five of such timing intervals being here given in the illustration.

Also illustrated in Figure 2 for the five timing intervals are complementary output signals *m* and *m'* of flip-flop M, signal *m* being, for the purposes of illustration, at its low voltage level for the first and fourth intervals and high for the second, third and fifth intervals. In accordance with the circuitry of the present invention, each low voltage level occurring for a timing interval represents a binary value of one while a high voltage level represents the binary value of zero, these representations being opposite to those normally used in the binary computer art. Accordingly, signal *m* represents the binary one value during the fist and fouth intervals and the binary zero value during the second, third and fifth intervals.

"And" circuits 11 and 12 are structurally similar to "or" gating circuits utilized in conventional binary computing systems wherein high and low voltage levels represent binary one and zero digit values, respectively. Here, owing to this difference in representation, circuit 11 acts as an "and" circuit since all input signals thereto must be simultaneously low or equal to a binary one value before the output voltage level, as it appears on common junction 15 of circuit 11 is also at the low level. This, of course, corresponds to the usual "or" circuit.

Before continuing with the description of the operation of the Figure 1 circuitry, reference is made to the determination of the value of resistor 16. This value is generally chosen in an empirical fashion by observing the junction 15 signal waveform with an oscilloscope over a discharging cycle. Whenever all input signals to a clocking gate circuit, such as circuit 11, are simultaneously low following an interval where at least one signal was high, capacitor 24 will discharge from the high to the low level through resistor 16 to the terminal $E_2$ negative potential source. More particularly, if this $E_2$ potential is —90 volts in magnitude as may be herein assumed, and the flip-flop M output signal varies between substantially zero and —2 volts, then upon each of signals *cl* and *m* being at the —2 volt level following an interval where one or both were high, the junction 15 potential will decrease from zero volts, its initial value, to —2 volts along the well known exponential discharge path or route toward the —90 volt level. The value of resistor 16 should preferably be chosen such that the —2 volt discharge is completed substantially at the end of the timing interval.

If its value is too low, the discharge will be completed in advance of the end of the interval but in so doing will require a larger quantity of current than is actually necessary and hence place unnecessary power burdens on the input signal sources. On the other hand, if its value is made too large, the discharge will not be completed by the end of the timing interval with the discharge not attaining the desired $E_1$ or —2 volt level. In this event as will be brought forth more completely later, the ensuing positive pulse produced at the beginning of the next timing interval, owing to signal *cl* rising to its next regularly occurring high level, will be less than the maximum possible amplitude with the ensuing possibility of an unreliable flip-flop triggering.

Figure 3:
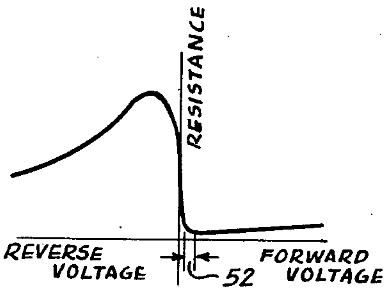
Figure 3 is a plot of a typical crystal diode front and back voltage versus resistance characteristics.

It has been found for a clock gating circuit to operate with an optimum discharge path as above defined, namely, the discharge to be substantially completed by the end of the given timing interval, the value of the resistor therein will be on the order of several megohms and, within quite a range of such values, the corresponding range of current flow therethrough from terminal $E_2$ through each diode connected to the common junction will produce a substantially constant voltage drop of $\Delta E$ across the front resistance of each diode. Accordingly, within this range of currents, the front resistance of germanium crystal diodes exhibits an inherent constant voltage characteristic. In particular, in Figure 3 is shown the forward and reverse voltage versus resistance characteristics of a typical germanium crystal diode with that portion designated 52 representing the constant voltage part. This portion, it will be noted, is of negative slope and denotes that a decrease in the conduction current causes a larger forward resistance to be effected, the two, in turn, resulting in the substantially same forward voltage drop across the diode. In the same way, an increase in current flow in this region, caused by a lower valued gating circuit resistor, for example, causes the diode to operate along a lowered forward resistance point, the new point, in turn, causing substantially the same front resistance drop.

The magnitude of this $\Delta E$ constant forward voltage drop which may be, for example, .15 volt for a Sylvania 1N58 diode, will be substantially the same for all diodes of a given make and type with different makes generally having different values. As will be evident, owing to this front resistance drop, the normal high voltage level on junction 15 will be more negative than zero volts by the amount $\Delta E$, while its low voltage level will be an amount $\Delta E$ less than the low voltage level of −2 volts. Accordingly, the output signal appearing on junction 15 of "and" circuit 11 and found as waveform 44 in Figure 2 will fall between the levels of $-\Delta E$ and $E_1-\Delta E$.

Returning now to Figure 2, at the end of the first interval following the discharge of capacitor 24 to the low level, $E-\Delta E$ in signal 44, timing signal *cl* rises instantly to the high level for a brief period during the first portion of the second interval and, in so doing, quickly charges capacitor 24 to the high level, the charging current coming from ground through the base resistor 27 of transistor 26. This charging current through resistor 27 produces a positive pulse designated 47 on the base electrode and is shown in the signal waveform 45 of Figure 2 of this base electrode potential.

Considering now the operation of flip-flop N, assume that for this first timing interval, transistor 26 is fully conducting while transistor 29 is non-conducting. Accordingly, owing to the subsequent current flow through collector resistor 34, output signal *n* will be substantially at the ground potential or at its relatively high voltage level. In the same way, output signal *n'* as it appears on the collector electrode of transistor 29 will be substantially at the $E_1$ potential or at its relatively low potential level.

To achieve bi-stable operation, the voltage dividing network comprising resistors 36 and 39 should have its values so related that when the collector electrode of transistor 26 is at the $E_1$ terminal potential owing to its being at cut-off, the base electrode potential of transistor 29 is maintained at such a potential relative to ground to provide for full current flow through transistor 29, taking into account the effects of the transistor 29 base electrode current flow to ground. Under such circumstances the voltage dividing network comprising resistors 31 and 27, having the same values as resistors 36 and 39, respectively, should be so related in magnitude that transistor 26 is maintained at cut-off through its base electrode potential owing to the fully conducting status of transistor 29. In the same way, these two voltage dividing networks should permit the inverse operation to be stable that is, with transistor 26 fully conducting transistor 29 should be maintained non-conducting.

Upon appearance of positive pulse 47 in signal 45, the base electrode of transistor 26 is driven positive relative to the emitter electrode or, stated differently, the emitter electrode becomes more negative relative to the base electrode. This results in a reduced base-emitter electrode current flow which reduction, in turn, serves to reduce the base-collector electrode current flow with the result that the potential on the collector electrode is lowered toward the potential on terminal $E_1$.

This lowered collector potential, in turn, is transmitted through the voltage dividing network of resistors 36 and 39 to the base electrode of transistor 29 which, in turn, serves to increase its emitter-base current flow by causing the potential of its emitter electrode to become more positive relative to its base. Such an increase in emitter base current flow produces a subsequent increase in the base to collector electrode current flow of transistor 29, the result being that the potential appearing on the collector electrode thereof is raised toward ground potential. This potential rise in being coupled back through the resistor 31 and capacitor 32 combination causes a further decrease of potential across resistor 27 hence driving the base and emitter potentials of transistor 26 closer together and hence toward cut-off condition.

This interaction between the two transistor circuits continues in an almost instantaneous fashion until their initial conduction states are reversed with signals *n* and *n'* being at the low and high voltage levels, respectively, during the second designated timing interval in Figure 2.

During the second timing interval, signals *m* and *m'* are at their high and low levels, respectively, to represent a binary zero value and, owing to the operation of "and" circuit 12, triggering capacitor 25 is, during the last half of this interval, slowly discharged from terminal $E_2$ through the relatively high valued resistor 21. This discharge wave-shape is found during the second interval of the signal designated 48 in Figure 2, it representing the signal potential on common junction 20 within circuit 12. The voltage levels of waveform 48 vary between $-\Delta E$ and $E_1-\Delta E$ as in signal 44 owing, as before, to the forward voltage drop $\Delta E$ across the front of each of the two diodes therein. At the beginning of the next following interval, capacitor 25 is suddenly charged due to the next appearing positive pulse in signal *cl*, this charging current accordingly producing a positive pulse across the base resistor 39 as is illustrated in the waveform designated 50 in Figure 2. This positive pulse in signal 50 causes a reversal of the action previously described by pulse 47 in signal 45 in that the then conducting and non-conducting states of transistors 26 and 29, respectively, are reversed with signals *n* and *n'* accordingly returning to their high and low levels.

Although the remaining portions of the signals illustrated in Figure 2 may be readily understood from the description thus far presented, it is to be particularly noted that the continuing low voltage level in signal *m'* during the third interval causes another discharge of capacitor 25 with an ensuing positive pulse at the beginning of the fourth interval to appear in signal 50. Owing to the then non-conducting status of transistor 29 this positive pulse is ineffective to produce any further change in its conduction status since it will, as understood from the prior descriptions, tend only to decrease further its non-current conducting condition by making the emitter electrode of transistor 29 momentarily even more negative with respect to its associated base electrode than is normal during its non-conducting period of operation.

Figure 4:
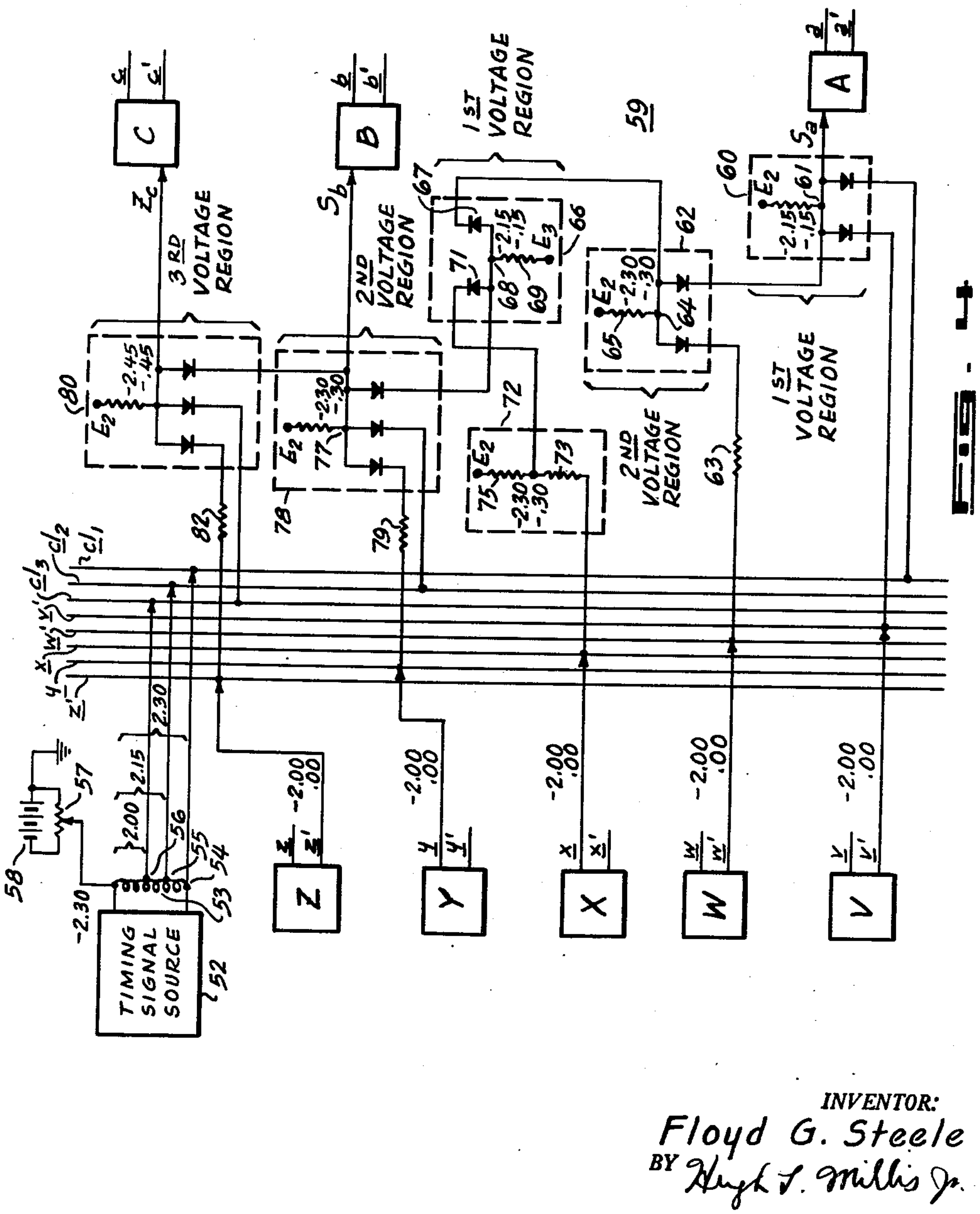
Figure 4 is a circuit diagram of a diode gating network and associated flip-flops according to the present invention.

Having set forth the operation of a single transistor flip-flop in conjunction with triggering "and" gating circuits, reference is now made to Figure 4, where there is illustrated a multi-region gating network shown in conjunction with various flip-flops for the purpose of setting forth the required modifications in conventional gating circuits in accordance with the present invention in order that they may be utilized with flip-flops having extremely low level voltage swings, say on the order of 2 volts or less. This gating circuit configuration as illustrated, the flip-flops feeding the gating network, and the flip-flops driven by such network are set forth by way of example only, and may be considered as forming a portion only of a complete computer system. However, definite triggering operations are accomplished by the network in accordance with the following Boolian equations:

$$S_a=v'\cdot cl \qquad \text{Equation 1}$$

$$S_b=(v'\cdot w'+x)\cdot y\cdot cl \qquad \text{Equation 2}$$

$$Z_c=(v'\cdot w'+x)\cdot y\cdot z'\cdot cl \qquad \text{Equation 3}$$

Flip-flops V, W, X, Y and Z, each of which may be similar to flip-flop N of Figure 1, are illustrated with their respective signals *v'*, *w'* *x*, *y* and *z'* being applied to the multi-region gating circuit indicated generally at 59. In the same way, flip-flops A, B and C, each of which may also be similar to flip-flop N of Figure 1, receive from gating network 59 triggering signals on their $S_a$, $S_b$ and $Z_c$ input terminals, respectively. Also included is a timing signal source 52 preferably of a blocking oscillator type, it having an output coil winding 53 including, in turn, three taps 54, 55, and 56 on which appears signals $cl_1$, $cl_2$, and $cl_3$, respectively. The opposite end of coil 53 from the end having tap 54 is connected to the movable arm of a potentiometer 57, the ends of potentiometer 57 being connected across the terminals of a potential source, such as battery 58, the positive terminal of the battery being grounded.

Considering now gating network 59, signals $v'$ and $cl_1$ are applied to the two input terminals of an "and" gating circuit 60, similar to circuit 11 in Figure 1, these input terminals being coupled through the usual diodes to a common junction 61. The output terminal of circuit 60, taken from junction 61, is coupled to the $S_a$ input conductor of flip-flop A and is also coupled to one input terminal of another "and" gating circuit 62, similar to circuit 60. Signal $w'$ is applied through an external resistor 63 to the other input terminal of circuit 62, the two input terminals being connected through diodes to a common junction 64. Junction 64 is connected through the gating circuit resistor 65 to terminal $E_2$ with the output signal of circuit 62 appearing on the junction being applied to one input terminal of a two terminal "or" gating circuit 66. This input terminal is coupled to the anode of a first diode 67, the cathode of diode 67 being, in turn, coupled to a common junction 68. Junction 68 is connected through a relatively high valued resistor 69 to a terminal $E_3$ of a source of positive potential which, for the purposes of this example, may be 90 volts.

The other input signal to circuit 66, is derived from a voltage lowering circuit 72 by having signal $x$ applied through a first resistor 73 and a second resistor 75 to the $E_2$ terminal. The output signal of circuit 72 is taken between the junction of resistor 73 and 75 and is applied within "or" circuit 66 through a diode 71 to junction 68. The purpose of circuit 72 will be more apparent later. The output signal of "or" circuit 66, taken from junction 68, is applied to one input terminal of a three terminal "and" gating circuit 78 and from there to the common junction 77 therein. Timing signal $cl_2$ is applied to another input terminal while signal $y$ is applied through a resistor 79 to the remaining input terminal of circuit 78. Circuit 78 is similar to circuit 60 as modified to include three input terminals.

The output signal of circuit 78 is applied to the $S_b$ input terminal of flip-flop B and is further applied to one input terminal of another three terminal "and" gating circuit 80, signal $cl_3$ being applied to another input terminal thereof. Finally, signal $z'$ is applied through an external resistor 82 to the remaining input terminal of circuit 80, with the output signal of circuit 80 being applied to the $Z_c$ input conductor of flip-flop C.

As was demonstrated in that portion of the previously referred to application for patent dealing with the calculation of the gating network resistor values, such resistors, including the network of Figure 4 within the present disclosure, will exhibit a wide variation in their values, the upper limits in the present case being on the order of several megohms. This is true since each individual circuit will have its own particular current requirements as determined by its placement in the gating network relative to the other gating circuits, the number of input signals applied thereto, the back resistance characteristics of the diodes contained therein at the back voltage placed thereon by the particular flip-flop swings employed, etc. Accordingly, if a current analysis were performed for the circuit of Figure 4 and the resistor values determined for each of the ordinary gating circuit resistors, not including the extra resistors 63, 79 and 82 in the input leads, it would be found that such a variation in their values would occur. However, within the range of such resistor values as stated before, it has been found that the crystal diodes will exhibit substantially the same forward voltage drop owing to their constant voltage characteristics under low forward current flow.

Considering now gating circuit 60, the common junction therein will vary between —.15 volt and —2.15 in accordance with the input signal variance of from zero and —2 volts, the difference being due to the .15 volt drop across the fronts of the diodes therein assuming, by way of example, that the Sylvania 1N58 diodes are used therein. It will be noted that although the absolute potential magnitude on the common junction is in effect lowered .15 volt thus making it operate in a different voltage region, the total 2 volt swing or excursion of the input signals will still appear on the common junction. Hence, the output triggering signals applied from circuit 60 to the $S_a$ conductor of flip-flop A will be the same magnitude as that previously set forth in Figure 2 for the circuit of Figure 1.

The trouble lies, however, in the compounding or cascading individual gating circuits where the output signal from one "and" gating circuit, such as circuit 60, is applied to one input terminal of a second "and" circuit, such as circuit 62, the other input terminal of the second circuit receiving directly the zero to —2 volts swing of a flip-flop. Thus considering circuit 62, assuming for the moment that resistor 63 has been omitted, and referring to the below included table, the following conclusions may be drawn:

*Table*

| Line | Signal $w'$ (volts) | Circuit 60 Signal (volts) | Circuit 62 Signal (volts) |
|---|---|---|---|
| 1 | 0 | —.15 | —.15 |
| 2 | 0 | —2.15 | —.15 |
| 3 | —2 | —.15 | —.3) |
| 4 | —2 | —2.15 | —2.15 |

On lines 1 through 4 and the first and second columns are found all possible combinations of signal $w'$ and the circuit 60 output signal magnitudes. Recalling first of all that the output signal of an "and" gating circuit of the type herewith described will be controlled by the highest level of all of the input signals applied thereto, it is seen that from the first two lines, the circuit 62 output signal will correspond to —.15 volt or the signal $w'$ value as dropped across the front of its respective diode. Hence, signal $w'$ will control the output signal level under these two cases. However, on line 3 where signal $w'$ is of lower magnitude than the output signal of circuit 60, the circuit 60 signal will control the output signal of circuit 62 and, after its potential magnitude —.15 volt has been dropped across the front of its associated diode, will produce an output gating signal of —.30 volt. On the fourth line is given the case where both input signals are at their lower levels, with signal $w'$ controlling, it being the upper value of the two, with the circuit 62 output signal accordingly being at —2.15 volts.

As may be seen from the table, whenever the input signal combinations should switch from the example given on line 3 or —.30 volt to either of the cases on lines 1 or 2, that is —.15 volt, a positive pulse will be generated on the associated flip-flop input conductor with an ensuing danger of spuriously triggering the flip-flop. In the same way, if the output signal condition defined on line 4 should switch to that defined on either lines 1 or 2, then a complete 2 volt swing will be produced to thereby generate a positive pulse of the same magnitude as that described in Figure 2. On the other hand, if the line 4 condition should switch to the —.30 volt level of line 3 then a smaller than normal positive pulse will be generated and, in this case, a danger exists that the flip-flop will not be triggered when required.

In order to eliminate the difficulties presented by the conditions described above, a series resistor 63 is inserted in the signal $w'$ line in order to drop the absolute levels or the voltage region of the $w'$ signal swing to where it equals the voltage region of the circuit 60 output signal swing. In other words, the value of resistor 63 should be such that signal $w'$ will actually vary between —2.15 and —.15 volts at the anode of its respective gating circuit diode and this swing when dropped across the diode will lie in the same region as the swing of circuit 60 signal applied through its associated diode to the circuit 62 common junction. The value of resistor 63 may be readily calculated by recalling that the potential on terminal $E_2$ is —90 volts and that a voltage division will occur between the gating circuit resistor 65 and resistor 63. Hence, if resistor 65 should be 2 megohms for example, then to produce a .15 voltge drop across resistor 63 and a corresponding 89.85 volt drop across resistor 65, resistor 63 should be approximately 3300 ohms in value. With this accomplished, then common junction 64 of circuit 62 will have the same full two volt swing of each of the input signals thereto with its swing taking place within the voltage region of —.30 and —2.30 volts.

The output signal of circuit 62 is applied, as before mentioned, to one input terminal of "or" gating circuit 66. This signal, varying between —2.30 and —.30 volts, in passing serially through diode 67, resistor 69 to the $E_3$ terminal of +90 volts, will again cause a .15 voltage drop to take place across diode 67, this voltage drop, owing to the positive potential on terminal $E_3$ and the direction of connection of diode 67, serving to be effectively added to the incoming signal magnitudes. Hence, common junction 68 will vary in potential between —2.15 and —.15 volts and thereby lie in the same voltage region as does the common junction of the first described "and" circuit 60. Accordingly, if the voltage swing of —.15 to —2.15 volts on the circuit 60 common junction 61 is designated as falling within the first voltage region of the multi-voltage region gating network and the voltage swing of —.30 to —2.30 volts on junction 64 within circuit 62 is said to fall within a second voltage region of the gating network, then common junction 68 within circuit 66 will have voltage swings lying within the first region.

Considering now the application of signal $x$ to circuit 66, it is evident that if this signal were applied directly through diode 71 to junction 68, this junction, owing to signal $x$ alone, would vary between —1.85 and +.15 volts and hence be in a different voltage region than the other input signal from circuit 62. Hence, in order to convert the region of the signal $x$ swing into that of the output signal from circuit 62, a voltage dividing network 72 is included, it comprising two serially connected resistors, 73 and 75 between the signal $x$ conductor and terminal $E_2$. Recalling the 90 volt negative volt potential appearing on signal $E_2$, the ratio of values between resistors 73 and 75 should be so related that their common junction will vary between —2.30 and —.30 volts, corresponding to the —2.00 and the 0 volts, respectively, of signal $x$. With this accomplished, then the two input signals to circuit 66 will vary between the identical two levels and the common junction therein will swing as before noted, within the first potential region as established for circuit 60.

Neglecting again the timing signal, in this case signal $cl_2$, the —2.15 and —.15 voltage swings from circuit 66 will, when applied to the "and" circuit 78 produce swings of —2.30 to —.30 volts on the common junction, therein, these magnitudes defining the second voltage region. For the reasons previously explained in connection with circuit 62, a voltage dropping resistor 79 must be included in the incoming signal $y$ line such that it, in conjunction with the gating circuit resistor, will produce the required .15 voltage drop of the signal $y$ values. With this done, then all signals applied to circuit 78 will lie in the same voltage region and hence the circuit will operate in the manner described for the other second region circuit 62 and hence apply the proper input signal swings to the $S_b$ conductor of flip-flop B.

Finally, "and" circuit 80 receives as one input signal the output signal of circuit 78 which, after the usual .15 voltage drop through its associated input diode, will cause the voltage levels on the common junction therein to vary between —.45 and —2.45 volts, these levels lying within a third voltage region. In this instance also, signal $z'$ must be dropped through dropping resistor 82 such that its voltage region on the anode side of its associated diode will fall between —2.30 and —.30 volts and hence, be equivalent to that of the circuit 78 output signal. The calculation of resistor 82 may be performed in the same way set forth previously for the calculation of resistor 63 bearing in mind, however, that the voltage drop thereacross must be .30 volt rather than .15 volt in order to lower it to the required third region.

Turning now to the various clocking signals, as before stated, source 52 may comprise a conventional blocking oscillator, the transformer therein having a third winding 53 on which is produced the required timing signals. Briefly, one end of this third winding is connected to a source of negative potential whose magnitude equals the lowest valued input signal level applied to the highest numbered voltage region gating circuit in the network, it being, in this case, —2.30 volts to correspond to the output signal of circuit 78 applied to circuit 80.

With this done, all of the clocking signals, that is, $cl_1$, $cl_2$, and $cl_3$, will be normally at a —2.30 volt level during the quiescent state of the blocking oscillator. Now, signal $cl_1$ is tapped off of this third winding 53 at such a point that each positive pulse produced by source 52 rises a maximum of 2.30 volts above the normal negative potential. Accordingly then, signal $cl_1$ varies between —2.30 volts and zero volts.

Considering now its operation in conjunction with the first region "and" circuit 60, it is apparent that this clocking signal when at its normal value of —2.30 volts will be effectively isolated through the back resistance of its associated diode from common junction 61 of circuit 60, it always being at a lower negative value than signal $v'$, the other input signal applied to circuit 60. Thus, signal $v'$ will determine the level of the junction in circuit 60. However, whenever source 52 produces a positive pulse when signal $v'$ is low, the rise in signal $cl_1$ to zero volts will be effectively transmitted through its associated diode and hence operate the gating circuit in the manner contemplated by quickly charging the input capacitor in flip-flop A. Whenever signal $v'$ is high or at zero volts, no triggering signal is applied to flip-flop A since signal $cl_1$ will only barely attain that value and consequently have no effect on the junction 61 potential.

Signal $cl_2$, applied to the second voltage region gating circuit 78 will vary in magnitude between a normal or base level of —2.30 volts upward 2.15 volts, owing to the position of its associated tap on winding 53, to an absolute value of —.15 volt, this latter value corresponding to the highest input signal values to the second region circuits. Signal $cl_2$, when at its normal low or —2.30 volt level will be isolated from the common junction of circuit 78 through the back resistance of its associated diode and hence will only be effective to operate the circuit when it rises to its high level, assuming the junction within circuit 78 is at its low or —2.30 level.

Finally, signal $cl_3$ will be taken from winding 53 such that each positive pulse produced will rise 2 volts above the normal level of —2.30 volts and hence attain —.30 volt at its maximum amplitude. This region of —2.30 to —.30 volts, corresponds exactly to the third voltage region and in this case only, the diode associated with signal $cl_3$ will not be back biased during its normal low voltage periods as was the case for the other clocking diodes.

In general, each voltage region of a gating network requires its own timing signal with each of such signals having an identical low voltage level corresponding in value to the low level signal applied to the highest region circuit in the network. This corresponds in the present example to —2.30 volts, or the value of the low level signal applied to circuit 80 of the third region. For example, if a fourth level were illustrated in Figure 4, potential source 57 would preferably be normally of —2.45 volts in magnitude to correspond to the lower level signals applied to this level.

Then, the various timing signals may be tapped off of an output blocking oscillator transformer winding, for example, corresponding to the various regions whereby the maximum potential value attained in each positive going pulse produced in each timing signal equals the upper signal level applied to its corresponding voltage region. In accordance with the present invention, for example, the tap corresponding to the highest or third voltage region circuit is 2 volts above the normal voltage applied to the transformer with the succeeding taps enclosing greater voltage swings in accordance with their particular gating circuit regions. It may also be noted that if the lower level in a multi-region network should be an "or" circuit such as circuit 66, then the first region signals would be more positive than the flip-flop signals.

Although the present invention has been described with particular reference toward transistor flip-flops with "and" diode gating circuits requiring negative rather than positive power supply potentials, it will be quite obvious to one skilled in the art how the forward diode voltage drops occurring in the more standard computer circuits using transistor or tube flip-flops and positive potentials may be readily compensated for by the techniques herein set forth. For example, if terminal $E_2$ produced a positive potential and the flip-flop output signals varied between zero and +2 volts, then junction 61 would alternate between +.15 and +2.15 volts and, for a correct application of signal $w$ to circuit 62, the same value of resistor 63 as before calculated should be employed since it would form with resistor 65 the same compensating voltage division as before set out.

What is claimed is:

1. In combination: a gating network including a plurality of diode gating circuits, each of said plurality of gating circuits having at least a pair of input terminals and producing an output signal; means for directly applying the output signals of certain of said plurality of gating circuits to input terminals of others of said plurality of gating circuits in a predetermined manner whereby the output signals produced by the others of said plurality of diode gating circuits fall in a second and a series of successively higher voltage regions; a series of electronic switching circuits, each of said switching circuits producing at least one output signal, all of the output signals of said series of switching circuits falling in a first voltage region; and means for applying the output signals of said series of electronic switching circuits to input terminals of said plurality of gating circuits in a predetermined fashion, the last-named means including resistor means for each signal applied to one of the others of said plurality of diode gating circuits.

2. The combination of claim 1 including, in addition, means for producing a plurality of timing signals, one for each voltage region, and means for applying each of said plurality of timing signals to at least one of the gating circuits whose output signal falls in its associated voltage region.

3. In combination: 1st, 2nd, . . . *n*th gating circuits producing output signals lying in 1st, 2nd, . . . *n*th voltage regions, respectively; 1st, 2nd, . . . *n*th electronic switching circuits, each of said circuits producing at least one output signal, all of the output signals of said electronic switching circuits lying within the same voltage region; means for directly applying the output signals of said 1st, 2nd, . . . $(n-1)$th gating circuits to said 2nd, 3rd, . . . *n*th gating circuits, respectively; means for directly applying the output signal of said 1st electronic switching circuit to said 1st gating circuit; and 1st, 2nd, . . . $(n-1)$th resistor means for applying the output signals of 2nd, 3rd, . . . *n*th electronic switching circuits to said 2nd, 3rd, . . . *n*th gating circuits, respectively, the values of said 2nd, 3rd, . . . $(n-1)$th resistor means serving to change the voltage region of the output signals of their respective electronic switching circuits to the same voltage region as that produced by said 1st, 2nd, . . . $(n-1)$th gating circuits, respectively.

4. The combination of claim 3 including, in addition, means for producing 1st, 2nd, 3rd, . . . *n*th timing signals, said 1st, 2nd, 3rd, . . . *n*th timing signals swinging at least within said 1st, 2nd, 3rd, . . . *n*th voltage regions, respectively, and means for applying said 1st, 2nd, 3rd, . . . *n*th timing signals to said 1st, 2nd, 3rd, . . . *n*th gating circuits, respectively.

5. The combination of claim 4 wherein the timing signal producing means is a blocking oscillator circuit having an output winding, said output winding having 1st, 2nd, . . . *n*th taps on which appear said 1st, 2nd, . . . *n*th timing signals, respectivley.

6. In combination: first and second electronic switching circuits, each of said switching circuits producing at least one output signal, each of said output signals lying in the same voltage region; at least first and second diode gating circuits, each of said gating circuits having a plurality of input terminals and producing a single output signal; means for applying the output signal of said first electronic switching means to one of the input terminals of said first gating circuit whereby the output signal of said first gating circuit lies in a different voltage region from the output signals of said switching circuits; means for directly applying the output signal of said first gating circuit to one of the input terminals of said second gating circuit; and means for applying the output signal of said second electronic switching circuit to one of the remaining input terminals of said second gating circuit, the last-named means including resistor means for changing the output signal of said second electronic switching circuit into the same voltage region as the output signal of said first gating circuit.

7. In combination: first and second signal sources, the output signal from said first source varying between first and second voltage levels, the output signal from said second source varying between third and fourth levels, said first and third and said second and fourth levels differing by the same amount; a gating circuit having a pair of input terminals; means for applying the output signal from said first signal source to one input terminal of said gating circuit; and resistor means for applying the output signal from said second signal source to the other input terminal of said gating circuit, said resistor means producing said amount of voltage difference on the output signal from said second source whereby both signals applied to said gating circuit vary between the same voltage levels.

8. In combination: first and second output signal sources, the output signal from said first source varying between first and second voltage levels, the output signal from said second source varying between third and fourth voltage levels, the voltage difference between said first and third voltage levels and the voltage difference between said second and fourth voltage levels being the same predetermined amount; a source of potential; a resistor; first and second diodes, one end of each of said diodes being connected to one end of said resistor; means connecting the other end of said resistor to said source of potential to form a gating circuit; means for connecting said first signal source to the other end of said first diode, the current flow through said first diode and resistor to said source of potential producing said predetermined voltage drop across said first diode; and voltage dropping means for applying the output signal of said second source to the other end of said second diode, the voltage drop across said voltage dropping means from the current flowing through said second diode and resistor to said source of potential being substantially said predetermined amount whereby the signals from said first and second sources vary between the same voltage levels at said first and second diodes, respectively.

9. The combination of claim 8 wherein said voltage dropping means comprises a second resistor whereby said resistor and said second resistor together form a voltage dividing network with their values being so related that said predetermined amount of voltage difference appears across said second resistor.

10. In combination: a flip-flop producing an output signal varying between first and second voltage levels; a first gating circuit producing an output signal varying between third and fourth voltage levels, said first and third voltage levels and said second and fourth voltage levels differing by a predetermined amount; a second gating circuit including a source of potential, a resistor, and first and second diodes, one end of each of said first and second diodes being coupled to one end of said resistor with the other end of said resistor being coupled to said source of potential; means for applying the output signal of said first gating circuit to the other end of the first diode within said second gating circuit; and resistor means for applying the output signal of said flip-flop to the other end of the second diode within said second gating circuit, the value of said resistor means being such as to produce said predetermined amount of voltage drop on said flip-flop signal whereby both signals applied to the first and second diodes in said second gating circuit vary between substantially the same voltage levels.

11. In combination: first and second flip-flops, each of said flip-flops producing an output signal varying between first and second voltage levels; a first gating circuit producing an output signal varying between third and fourth voltage levels, said first and third, and said second and fourth voltage levels differing by a predetermined amount; second and third gating circuits, each of said second and third gating circuits including a source of potential, a resistor, and first and second diodes, one end of each of said first and second diodes being coupled to one end of said resistor with the other end of said resistor being coupled to said source of potential; means for applying the output signal of said first gating circuit to the other end of the first diode in said second gating circuit; first resistor means for applying the output signal of said first flip-flop to the other end of the second diode in said second gating circuit, the value of said resistor means being such as to produce said predetermined amount of voltage drop on said first flip-flop signal whereby both signals applied to said second gating circuit vary between the same voltage levels, the output signal of said second gating circuit varying between fifth and sixth voltage levels, said fifth and sixth voltage levels differing from said third and fourth voltage levels by said predetermined amount; means for applying the output signal of said second gating circuit to the other end of the first diode in said third gating circuit; and second resistor means for applying the output signal of said second flip-flop to the other end of the second diode in said third gating circuit, the value of said second resistor means being such as to produce twice said predetermined amount of voltage drop on said second flip-flop signal whereby both signals applied to said third gating circuit vary between the same voltage levels.

12. A gating circuit for use with first and second sources of input signals, each of the input signals produced by said sources swinging between upper and lower negative voltage levels, the upper and lower voltage levels of said first and second signals lying within first and second voltage regions, respectively, said gating circuit comprising: first and second unidirectional flow devices, each of said devices having an anode and a cathode; a source of negative potential, the magnitutde of negative potential being greater than the lower voltage level of either of the input signals; a first resistor having a pair of ends; means for coupling one end of said first resistor to the cathodes of said first and second unilateral flow devices; means for coupling the other end of said resistor to said source of negative potential; means for directly applying the input signal produced by the second source to the anode of said first unilateral flow device; and a second resistor conductively coupled between the first input signal source and the anode of said second unilateral flow device, the value of said second resistor being so related to the value of said first resistor to cause the upper and lower voltage levels of said first signal as applied to said second unilateral flow device to lie in said second voltage region.

13. In combination: at least first and second electronic switching means, each of said switching means producing at least one output signal, each of said output signals switching between identical first and second voltage levels; at least first and second diode gating circuits, each of said gating circuits including an output terminal; means for applying the output signal of said first electronic switching means to said first gating circuit whereby the output signal appearing on the output terminal thereof varies between third and fourth voltage levels corresponding to said first and second voltage levels, respectively; means for applying the output signal of said first gating circuit to said second gating circuit; and means for applying the output signal of said second electronic switching means to said second gating circuit, the last-named means including a resistor for changing the first and second voltage levels of the output signal of said second electronic switching means into said third and fourth voltage levels whereby all of the signals applied to said second gating circuit switch between the same voltage levels.

14. In combination with first and second complementary input signals, each of said signals comprising a series of alternate upper and lower negative voltage levels, each of said levels appearing for an integral number of timing intervals measured by a timing signal, said timing signal cyclically varying between said upper and lower negative voltage levels: a bi-stable flip-flop having first and second input terminals and responsive to positive pulses applied to said first and second conductors for triggering into first and second conduction states; first and second "and" diode gating circuits, each of said gating circuits having a pair of input terminals and responsive to the change of one or both of a pair of input signals applied to said pair of input terminals, respectively, going to the upper negative voltage level following the simultaneous appearance of their lower negative voltage levels for producing positive going output signals; means for applying the first and second complementary input signals to one input terminal of each of said first and second "and" gating circuits, respectively; means for applying the timing signal to the remaining input terminal of each of said first and second "and" gating circuits whereby each "and" circuit produces an output positive signal following each timing interval its respective input signal is at its low voltage level; and means for applying the output signals of said first and second "and" gating circuits to the first and second input terminals of said bi-stable flip-flop whereby the conduction state sequence of said flip-flop corresponds to the voltage level sequence in the first and second input complementary signals.

15. In combination with first and second complementary input signal sources, each of the signals produced by said first and second sources comprising a series of alternate upper and lower negative voltage levels, each of said levels appearing for an integral number of timing intervals measured by a timing signal, said timing signal cyclically varying between said upper and lower negative voltage levels: a bi-stable flip-flop including first and second transistors, each of said transistors having base, emitter and collector electrodes, a first source of negative potential, first and second load means connected between the collector electrodes of said first and second transistors, respectively, and said first source of negative potential, means for grounding the emitter electrodes of said first and second transistors, first and second resistor means conductively coupled between the base electrodes of said first and second transistors, respectively, and ground, and first and second feedback means connected between the collector and base electrodes of said first and second transistors, and between the collector and base electrodes of said second and first transistors, respectively, said flip-flop being responsive to triggering pulses applied across said first and second resistor means for producing lower and upper voltage levels across said first load means; first and second "and" gating circuits, each of said circuits including a second source of negative potential, first and second diode means, each of said diode means including an anode and a cathode, resistor means having first and second ends, means connecting the cathodes of said first and second diodes to one end of said resistor means, and means for connecting the other end of said resistor means to said second source of potential, the one end in each of said gating circuits going to the upper negative voltage level whenever either or both of the signals applied to the anodes of the diodes therein go to the upper negative voltage level following the simultaneous appearance of their lower negative voltage levels; first and second capacitor means; first connecting means for coupling said first capacitor means between the one end of the resistor means in said first "and" circuit and the base electrode of the first transistor in said flip-flop said first capacitor means delivering a triggering pulse to said flip-flop whenever the one end in said first "and" circuit goes to the upper negative voltage level; second connecting means for coupling said second capacitor means between the one end of said resistor means in said second gating circuit and the base electrode of the second transistor in said flip-flop said second capacitor means delivering a triggering pulse to said flip-flop whenever the one end in said first "and" circuit goes to the upper negative voltage level; means for applying the first and second input signals to the anodes of the first diodes in said first and second gating circuits, respectively; and means for applying the timing signal to the anodes of said second diodes in said first and second gating circuits whereby the voltage levels produced across the first load means in said flip-flop correspond to the voltage levels appearing in the first input signal.

16. A logical "and" gating circuit for use with a flip-flop responsive to positive going input signals for triggering, said circuit comprising: first and second input signal sources, each of the input signals produced by said first and second sources varying between lower and upper negative voltage levels; a source of negative potential; first and second crystal diodes, each of said diodes having an anode and a cathode; resistor means having first and second ends; means connecting the cathodes of said first and second crystal diodes to the first end of said resistor means; means connecting the second end of said resistor means to said source of negative potential; and means for applying the input signals of said first and second sources to the anodes of said first and second crystal diodes, respectively, whereby the first end of said resistor means goes to the upper negative voltage level to provide a positive going signal for the flip-flop whenever one or both of the input signals goes to the upper negative voltage level following a simultaneous appearance of their lower negative voltage levels.

No references cited.